(12) United States Patent
Achar et al.

(10) Patent No.: US 12,026,914 B2
(45) Date of Patent: Jul. 2, 2024

(54) CROSS SPECTRAL FEATURE MAPPING FOR CAMERA CALIBRATION

(71) Applicant: Google LLC, Mountain View, CA (US)

(72) Inventors: Supreeth Achar, Seattle, WA (US); Daniel Goldman, Seattle, WA (US)

(73) Assignee: Google LLC, Mountain View, CA (US)

( * ) Notice: Subject to any disclaimer, the term of this patent is extended or adjusted under 35 U.S.C. 154(b) by 220 days.

(21) Appl. No.: 17/597,428

(22) PCT Filed: Jan. 19, 2021

(86) PCT No.: PCT/US2021/070052
§ 371 (c)(1),
(2) Date: Jan. 5, 2022

(87) PCT Pub. No.: WO2022/159244
PCT Pub. Date: Jul. 28, 2022

(65) Prior Publication Data
US 2022/0277485 A1    Sep. 1, 2022

(51) Int. Cl.
*G06T 7/80*    (2017.01)
*G06T 7/73*    (2017.01)
(Continued)

(52) U.S. Cl.
CPC .................. *G06T 7/80* (2017.01); *G06T 7/74* (2017.01); *G06V 10/48* (2022.01); *G06V 10/60* (2022.01);
(Continued)

(58) Field of Classification Search
CPC ... G06T 7/80; G06T 7/74; G06T 2207/10012; G06T 2207/10048; G06T 2207/20081;
(Continued)

(56) References Cited

U.S. PATENT DOCUMENTS 10,867,408 B1    12/2020 Sethi et al.
11,117,570 B1 *   9/2021 Broggi .................. G06V 20/59
(Continued)

FOREIGN PATENT DOCUMENTS

CN    109040746 B    10/2019
CN    109040745 B    12/2019
(Continued)

OTHER PUBLICATIONS

International Search Report and Written Opinion for PCT Application No. PCT/US2021/070052, dated Oct. 19, 2021, 13 pages.
(Continued)

*Primary Examiner* — Albert Kir
(74) *Attorney, Agent, or Firm* — Brake Hughes Bellermann LLP

(57) ABSTRACT

A method including capturing a first image of a real-world scene by a first camera sensitive to a first spectrum of light, the first camera having a first light source, capturing a second image of the real-world scene by a second camera sensitive to a second spectrum of light, the second camera having a second light source, identifying at least one feature in the first image, identifying, using a machine learning (ML) model, at least one feature in the second image that matches the at least one feature identified in the first image, mapping pixels in the first image and the second image to rays in a three-dimensional (3D) space based on the matched at least one feature, and calibrating the first camera and the second camera based on the mapping.

23 Claims, 9 Drawing Sheets

(51) Int. Cl.
  *G06V 10/48* (2022.01)
  *G06V 10/60* (2022.01)
  *G06V 10/75* (2022.01)
  *H04N 13/246* (2018.01)
  *H04N 23/56* (2023.01)
  *G06V 10/774* (2022.01)

(52) U.S. Cl.
  CPC ......... *G06V 10/751* (2022.01); *H04N 13/246* (2018.05); *H04N 23/56* (2023.01); *G06T 2207/10012* (2013.01); *G06T 2207/10048* (2013.01); *G06T 2207/20081* (2013.01); *G06T 2207/20084* (2013.01); *G06T 2207/30244* (2013.01); *G06V 10/774* (2022.01)

(58) Field of Classification Search
  CPC ........... G06T 2207/20084; G06T 2207/30244; H04N 13/246; H04N 23/56; G06V 10/60; G06V 10/751; G06V 10/48; G06V 10/774
  USPC .......................................................... 348/47
  See application file for complete search history.

(56) References Cited

U.S. PATENT DOCUMENTS

| | | | |
|---|---|---|---|
| 11,768,504 B2 * | 9/2023 | Ebrahimi Afrouzi | G06N 3/084 701/25 |
| 2010/0121577 A1 * | 5/2010 | Zhang | G06F 18/256 382/104 |
| 2010/0303337 A1 * | 12/2010 | Wallack | B25J 9/1697 348/47 |
| 2014/0118500 A1 * | 5/2014 | Liu | G06T 7/80 348/46 |
| 2015/0022669 A1 | 1/2015 | Hall | |
| 2018/0315213 A1 | 11/2018 | Surazhsky et al. | |
| 2019/0311496 A1 | 10/2019 | Bloom et al. | |

FOREIGN PATENT DOCUMENTS

| | | |
|---|---|---|
| EP | 3608875 A1 | 2/2020 |
| WO | 2020000369 A1 | 1/2020 |

OTHER PUBLICATIONS

Beaupre, et al., "Domain Siamese CNNS for Sparsse Multispectral Disparity Estimation", arXiv:2005.00088v1, Apr. 30, 2020, 8 pages.
Zhu, et al., "Matching RGB and Infrared Remote Sensing Images With Densely-Connected Convolutional Neural Networks", Remote Sensing, 11, 2836, doi:10.3390/rs11232836, www.mdpi.com/journal/remotesensing, 2019, 18 pages.
Pinggera, et al., "On Cross-Spectral Stereo Matching Using Dense Gradient Features", BMVC 2012, 12 pages.
Zhi, et al, "Deep Material-aware Cross-spectral Stereo Matching", CVPR 2018, 10 pages.

\* cited by examiner

CROSS SPECTRAL FEATURE MAPPING FOR CAMERA CALIBRATION

CROSS-REFERENCE TO RELATED APPLICATION

This application is a 35 U.S.C. § 371 National Phase Entry Application from PCT/US2021/070052, filed on Jan. 19, 2021, entitled "CROSS SPECTRAL FEATURE MAPPING FOR CAMERA CALIBRATION", the disclosure of which is incorporated herein by reference in its entirety.

FIELD

Embodiments relate to geometric calibration of two or more cameras.

BACKGROUND

Geometric camera calibration is the process of determining the position and internal parameters (e.g., focal length) of a camera or set of cameras. Geometric calibration provides a mapping between camera pixels and rays in three-dimensional (3D) space. Calibration is determined by finding pairs of pixels in different camera views that correspond to the same point in the real-world scene and adjusting internal parameters of each camera to align the pairs of pixels (e.g., a pixel in an image of a first camera and a pixel in an image of a second camera are mapped to be the same in the real-world scene.

SUMMARY

In a general aspect, a device, a system, a non-transitory computer-readable medium (having stored thereon computer executable program code which can be executed on a computer system), and/or a method can perform a process with a method including capturing a first image of a real-world scene by a first camera sensitive to a first spectrum of light, the first camera having a first light source, capturing a second image of the real-world scene by a second camera sensitive to a second spectrum of light, the second camera having a second light source, identifying at least one feature in the first image, identifying, using a machine learning (ML) model, at least one feature in the second image that matches the at least one feature identified in the first image, mapping pixels in the first image and the second image to rays in a three-dimensional (3D) space based on the matched at least one feature, and calibrating the first camera and the second camera based on the mapping.

Implementations can include one or more of the following features. For example, the first camera can be a near infrared (NIR) camera, and the second camera can be a visible light camera. A ML model can be used to identify the at least one feature in the first image. An algorithm can be used to identify the at least one feature in the first image. A ML model can be used to match the at least one feature in the first image to the at least one feature in the second image, and at least one pixel of the second image can be assigned a score based on a likelihood that the at least one pixel of the second image matches a pixel of the at least one feature in the first image. An algorithm can be used to match the at least one feature in the first image to the at least one feature in the second image, at least one pixel of the second image can be assigned a score based on a likelihood that the at least one pixel of the second image matches a pixel of the at least one feature in the first image, and the at least one pixel of the second image can be assigned a direction based on a prediction of a position of a target pixel.

An algorithm can be used to identify the at least one feature in the first image, and the matching of the at least one feature in the first image to the at least one feature in the second image can include selecting, using a first ML model, a candidate feature from the at least one feature in the first image, matching at least one pixel in the second image to a pixel of the candidate feature, assigning a score to the matched at least one pixel of the second image based on a likelihood that the at least one pixel matches one of the at least one feature in the first image, predicting a direction of a position of a target pixel using a second ML model, and assigning the direction to the matched at least one pixel of the second image. The calibrating of the first camera and the second camera can be based on the matched at least one pixel of the second image associated with the candidate feature with the highest score and the direction of the matched at least one pixel of the second image with the highest score, the direction being based on the matched at least one pixel of the second image with the highest score and neighboring pixels. The method can further include selecting at least one search window in the second image based on a previous calibration. The machine learning model(s) can be trained on data captured from a calibrated multi camera system.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the example embodiments and wherein.

Figure 1A:
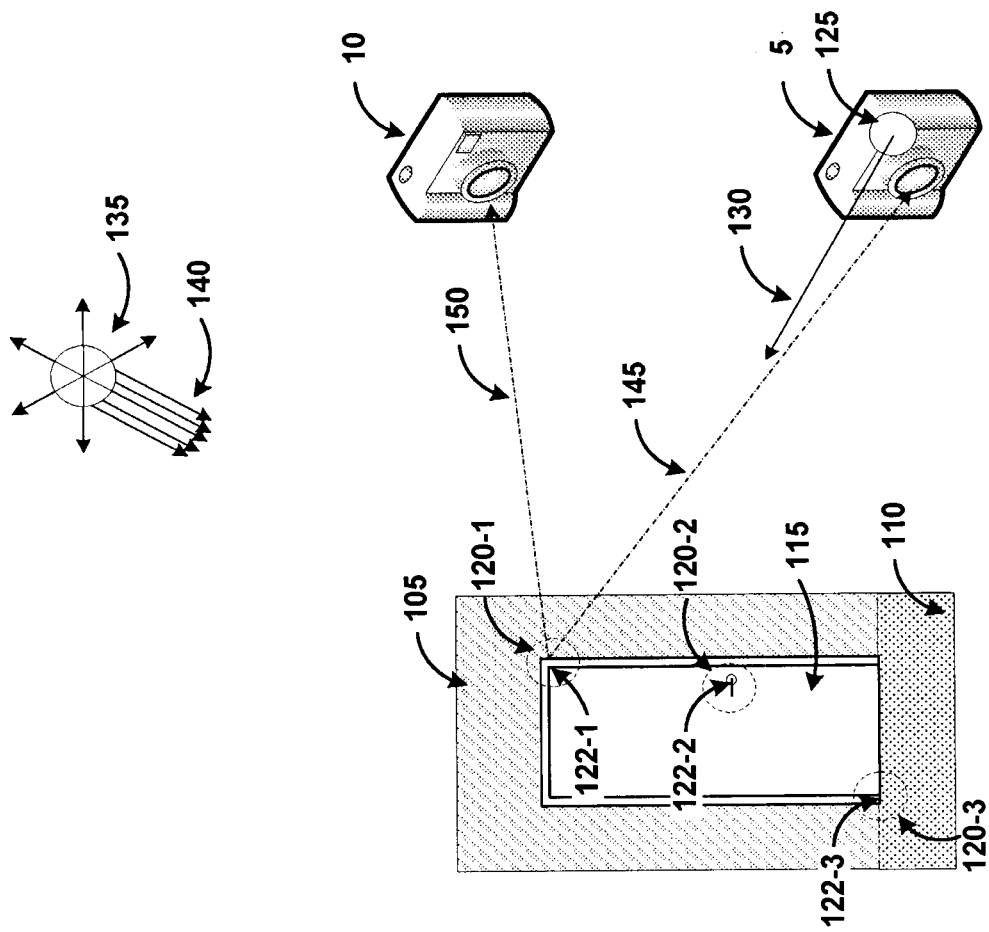
FIG. 1A illustrates a diagram of cameras and a scene according to at least one example embodiment.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION OF THE EMBODIMENTS

Feature matching for geometric camera calibration can be difficult in systems that include cameras sensitive to different parts of the light spectrum. For example, in systems that include a mixture of visible light and near infrared (NIR) cameras. Feature matching can be difficult because the visual appearance of objects can be very different in different light spectra. This problem can be exacerbated in situations where lighting conditions are different in different spectra as the appearance of a point in a real-world scene can change dramatically with the incident lighting. Calibration of mixed spectral camera systems typically requires the use of specially designed calibration targets that have fiducial markings that are easily detectable across different parts of the spectrum.

Using calibration targets can be undesirable in a system requiring minimal technical support while in use (e.g., a three-dimensional (3D) teleconferencing system). Example implementations described herein use, for example, a machine-learning (ML) based approach to solve the problem of finding matching feature points between, for example, a visible light image and a near infrared (NIR) image. A set of candidate features can be selected in the NIR image. The candidate features can represent pixels that can be easy to localize precisely (e.g., corners, transitions, spots, and/or the like). For each candidate feature, a search window is defined in the target red-green-blue (RGB) image. Each RGB pixel inside the search window can be assigned a score using a ML model (e.g., a neural network) scoring function that assigns high scores to pixels that are likely to correspond to the candidate NIR feature and low scores at other pixels.

A second ML model (e.g., a second neural network) can be used to predict a position (e.g., x, y position) of an exact match for each pixel in the search window. An estimated offset for each pixel in the search window (e.g., a prediction of how far along the image x and y axes the position of the exact match (e.g., position of an exact match pixel) is from the current RGB pixel. If an RGB pixel in the search window is found that has a sufficiently high score (e.g., highly likely to match), the estimated offset of the RGB pixel and its neighboring pixels can be averaged to find a target matching pixel position and a NIR to RGB match is created. The first and second ML models can be trained using data captured from a well calibrated multi camera system where correct matching feature pairs between the NIR and RGB cameras can be determined precisely.

FIG. 1A illustrates a diagram of cameras and a scene according to at least one example embodiment. FIG. 1A is used to illustrate a real-world scene used for identifying features in an image that can be used for calibrating a multi-camera system including cameras responsive to different types of light sources (e.g., IR and visible light). According to an example implementation, the real-world scene does not include specially designed calibration target (e.g., including characteristics identifiable for use in a camera calibration process).

As shown in FIG. 1A, a scene includes a first camera 5 and a second camera 10. Two cameras are shown for example purposes. However, example implementations can include many more than two cameras in a three-dimensional (3D) teleconferencing system. The first camera 5 and the second camera 10 can be configured to capture images of the scene illustrated as including a portion of a wall 105 in contact with a floor 110. The wall can include a door 115. The scene including the wall 105, the door 115 and the door can include a portion of an image including features 120-1, 120-2, 120-3. Each of the portion of the image including features 120-1, 120-2, 120-3 can be selected using a search algorithm and/or a ML model (e.g., a neural network). The ML model can be trained to select portions of an image (of the real-world scene). The portions of the image including features 120-1, 120-2, 120-3 can be corners, transitions, spots, and/or the like that can be precisely localized (or located). Features can include adjacent pixels having a color (e.g., NIR or RGB) gradient. In other words, features can be portions of the image (e.g., NIR image) with at least one color transition from a pixel to at least one adjacent pixel. For example, the portion of the image including features 120-1 can include the corner of door 115 122-1, the portion of the image including features 120-2 can include a distinguishable spot (e.g., a door handle 122-2), and the portion of the image including features 120-3 can include a corner of the door 115 and a transition from the door 115 to the floor 110 122-3. The search algorithm and/or ML model used to identify features can use an image captured in a spectra of light that is most difficult to identify features (e.g., NIR).

Camera 5 (e.g., a NIR camera) can include a light source 125 configured to generate at least one light ray 130 in the light spectra (e.g., NIR) associated with the camera 5. The scene further includes a light source 135 at least one light ray 140 in the light spectra (e.g., visible light) associated with the camera 10. Although light source 125 and light source 135 are illustrated as in a camera and external to a camera respectively, example implementations can include external light sources and camera light source alone and in combination. Ray 145 and ray 150 are light rays that are reflected from the real-world scene, are detected by a sensor of camera 5 and camera 10 respectively where an image point (e.g., pixel) is generated (e.g., by a sensor of the camera) in an image based on the ray 145, 150. Ray 145 and ray 150 can correspond to (or are reflected from) the same point in the real-world scene associated with feature 120-1. In an example implementation, prior to calibration, ray 145 and ray 150 may not be used to generate a pixel in an image at the same position (e.g., x, y position) in both camera 5 and camera 10. Therefore, camera 5 and camera 10 may be calibrated to align the pixel (in an image) generated by camera 5 based on ray 145 and the pixel (in an image) generated by camera 10 based on ray 150 to have the same position in the respective images.

Figure 1C:
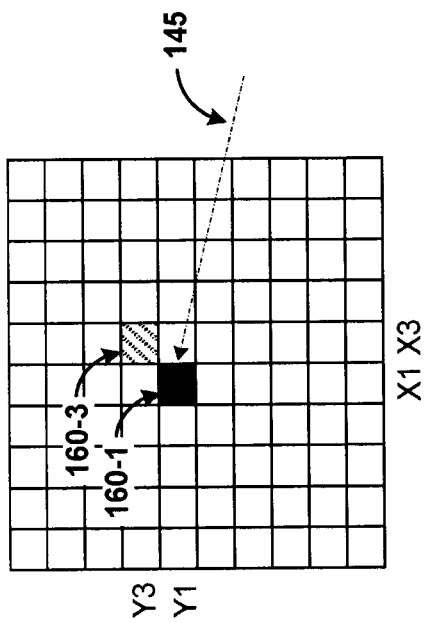
FIG. 1C and FIG. 1D illustrate camera sensors according to an example implementation.
Figure 1D:
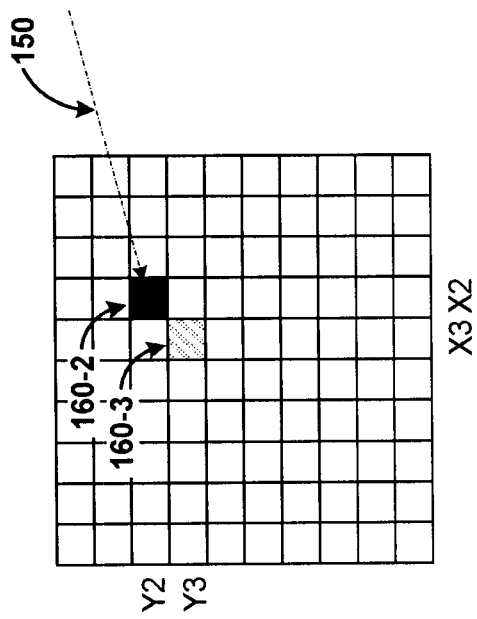
Figure 1B:
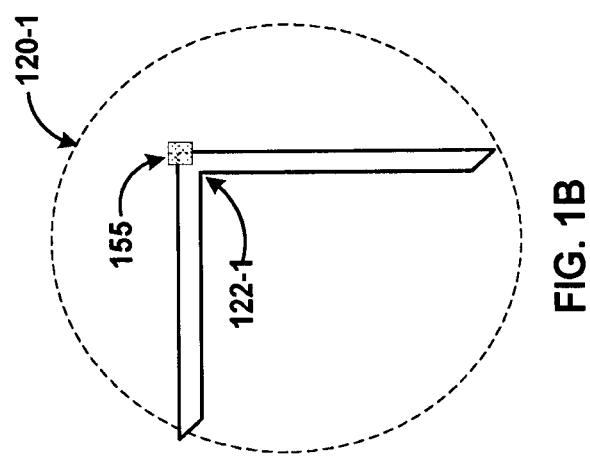
FIG. 1B is a two-dimensional (2D) diagram of a portion of the scene according to at least one example embodiment.

FIG. 1B is a two-dimensional (2D) diagram of a portion of the scene shown in FIG. 1A according to at least one example embodiment. FIG. 1B is used to illustrate a portion of an image that can include a pixel for use during calibration. In an example implementation, a pixel used for calibration can be a pixel in a first image that has a matching pixel in a second image. FIG. 1B illustrates the portion of the image shown in FIG. 1A including features 120-1. The portion of the image including features 120-1 can include the corner of the door 122-1. FIG. 1B illustrates the portion of the image including features 120-1 as a portion of a 2D image. The 2D image can be an RGB image (captured using camera 10) and the portion of the image including features 120-1 may have been identified using a NIR image (captured using camera 5). This 2D illustration shows a pixel 155 that can be a pixel identified as a pixel to use in camera calibration within the portion of the image including features 120-1. The pixel to use in camera calibration can be a pixel that has been located in an image captured by camera 5 with a corresponding (e.g., matching) pixel captured by camera 10 (shown in FIG. 1A).

FIG. 1C and FIG. 1D are used to illustrate a portion of a sensor of a camera and an interpreted position for a sensed light ray. FIG. 1C illustrates a camera sensor associated with camera 5. Sensor position 160-1 shown in FIG. 1C can correspond to a pixel (e.g., a NIR pixel) in a NIR image (not shown) captured by camera 5. Ray 145 can cause camera 5 to generate a pixel (not shown) in an image using sensor position 160-1 during an image capture process.

FIG. 1D illustrates a camera sensor associated with camera 10. Sensor position 160-2 shown in FIG. 1D can correspond to pixel 155 (e.g., an RGB pixel). As shown in FIG. 1D, ray 150 can cause camera 10 to generate pixel 155 using sensor position 160-2 during an image capture process.

The position (e.g., x, y coordinates) of a pixel (not shown) of the image captured using camera 5 should have the same pixel position of pixel 155. Therefore, sensor position 160-1 and sensor position 160-2 should be used to generate a pixel having the same x, y coordinates in the corresponding image. However, as seen in FIG. 1C and FIG. 1D, sensor position 160-1 and sensor position 160-2 do not have the same x, y coordinates. This is indicative of a multi-camera system in need of calibration. In other words, a calibrated multi-camera system should have the same sensor position (e.g., sensor position 160-3 associated with pixel 155 and a matched pixel captured using camera 5.

Figure 1E:
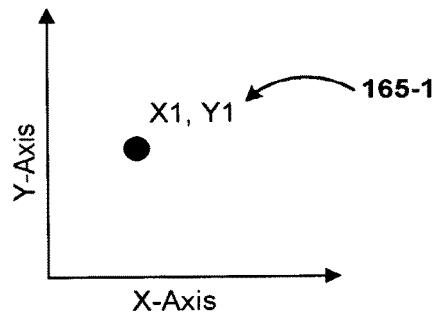
FIGS. 1E and 1F illustrate a 2D coordinate system representing a portion of an image according to at least one example embodiment.
Figure 1F:
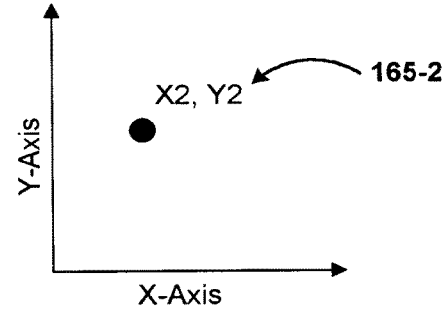
Figure 1G:
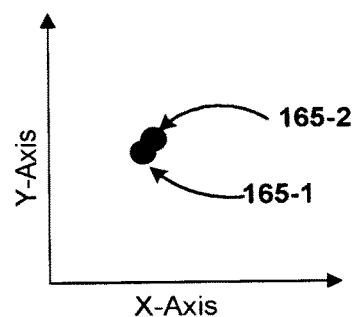
FIG. 1G illustrates a 2D coordinate system representing an overlay of the 2D coordinate system of FIG. 1E and the 2D coordinate system of FIG. 1F according to at least one example embodiment.

FIGS. 1E to 1G are used to illustrate 2D positions of pixels on an image before calibrating a multi-camera system. FIG. 1E illustrates a 2D coordinate system representing a portion of an image with a pixel 165-1 positioned at X1, Y1 corresponding to sensor position 160-1 (of camera 5). FIG. 1F illustrates a 2D coordinate system representing a portion of an image with a pixel 165-2 positioned at X2, Y2 corresponding to sensor position 160-2 (of camera 10). FIG. 1G illustrates a 2D coordinate system representing an overlay of the 2D coordinate system of FIG. 1E and the 2D coordinate system of FIG. 1F. Pixel 165-1 and pixel 165-2 can represent the same point (as matched pixels) in a real-world scene. In other words, pixel 165-1 and pixel 165-2 can represent a point in a real-world scene having the same 3D coordinates (x, y, z coordinates). Therefore, a 2D image including pixel 165-1 as captured using camera 5 and a 2D image including pixel 165-2 captured using camera 10 should share the same position (e.g., x, y coordinates) in the overlaid 2D coordinate system of FIG. 1G. As can be seen in FIG. 1G, pixel 165-1 and pixel 165-2 do not share the same position. Therefore, the cameras should be calibrated in order to align pixels of an image captured using camera 5 with pixels of an image captured using camera 10 (e.g., cause pixel 165-1 and pixel 165-2 to have the same 2D coordinates in their respective images).

Calibration can include adjusting calibration parameters such that computations associated with ray 145 and ray 150 are associated with the same target pixel position. The target pixel position should be the same position (e.g., x, y coordinates) in a 2D coordinate system representing a portion of an image.

Figure 1H:
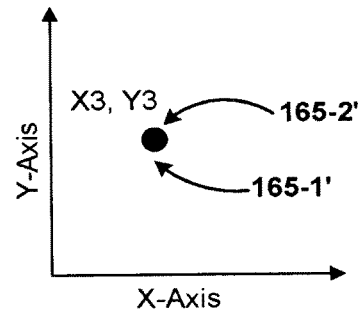
FIG. 1H illustrates a 2D coordinate system representing an overlay of the 2D coordinate system of FIG. 1E and the 2D coordinate system of FIG. 1F after a camera calibration process according to at least one example embodiment.

FIG. 1H is used to illustrate 2D positions of pixels on an image after calibrating a multi-camera system. FIG. 1H illustrates a 2D coordinate system representing an overlay of the 2D coordinate system of FIG. 1E and the 2D coordinate system of FIG. 1F after a camera calibration process. As shown in FIG. 1H, pixel 165-1' and pixel 165-2' share the same position X3, Y3 (also illustrated in FIG. 1C and FIG. 1D). Pixel 165-1' and pixel 165-2' represent pixel 165-1 and pixel 165-2 after calibration parameters have been adjusted such that ray 145 and ray 150 are associated with the same target pixel position. Calibrating pixel 165-1 and pixel 165-2 to the target pixel position can cause processing (e.g., by the cameras) of sensor readings associated with the ray 145 and the ray 150 to interpret 2D positions resulting in an interpretation of the rays as intersecting at the same point in the 3D real-world scene coordinate system.

Figure 1I:
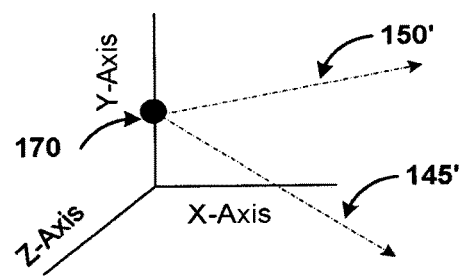
FIG. 1I illustrates a real-world scene 3D coordinate system after camera calibration according to at least one example embodiment.

FIG. 1I is used to illustrate the 3D position of a point in space that corresponds to the calibrated camera 2D pixel position described above. FIG. 1I illustrates a real-world scene 3D coordinate system after camera calibration with point 170 illustrating the point of intersection. Therefore, the target pixel position is a position of a pixel in a 2D coordinate system used to adjust calibration parameters of the cameras such that rays (e.g., ray 145' and 150') in the real-world scene 3D coordinate system intersect at a point (e.g., point 170) in the real-world scene.

Adjusting calibration parameters can cause an interpreted 2D position of sensed light rays (e.g., ray 145 and ray 150) to change within a camera such that the sensor position associated with the ray is associated with a different 2D sensed position. The calibration parameters can include intrinsic parameters and extrinsic parameters. Intrinsic parameters can include effective focal length, or image plane to projective center distance, lens distortion coefficient, scale factor for x, shift in origin of the acquired images due to camera scanning and/or acquisition timing error. Extrinsic parameters can be defined by the 3D position and orientation of the camera relative to a defined world coordinate system.

In an example implementation, the intrinsic parameters are considered to be within a specified range and the extrinsic parameters are adjusted. For example, parameters causing x, y, z coordinates of a point in the real-world scene to change can an element of the calibration. Further, parameters causing the x-axis, y-axis, and z-axis (e.g., orientation) coordinates of a coordinate plane in the real-world scene to change can an element of the calibration. Camera calibration is described using two cameras for example purposes. However, example implementations can include many more than two cameras in a three-dimensional (3D) teleconferencing system. For example, two (2) or mor NIR cameras and/or two (2) or more RGB cameras can be used. Further, a single matching pixel is described for example purposes. Example implementations can include the use of a plurality (e.g., 10s, 100s, 1000s, and/or the like) pixels in camera calibration.

Reference is made of machine learning (ML) models, the use of ML models, and the training of ML models. ML models can include the use of algorithms including convolutional neural networks, recursive neural networks, decision trees, random forest, k-nearest neighbor and/or the like.

For example, a convolutional neural network (CNN) can be used to match pixels, determine pixel positions, identify pixels, and/or the like. A CNN architecture can include an input layer, a feature extraction layer(s) and a classification layer(s).

An input can accept data (e.g., image data) in three dimensions (e.g., x, y, color). The feature extraction layer(s) can include a convolutional layer(s) and a pooling layer(s). The convolutional layer(s) and the pooling layer(s) can find features in the image and progressively construct higher-order features. The feature extraction layer(s) can be learning layers. The classification layer(s) can generate class probabilities or scores (e.g., indicating the likelihood of a match).

Training (e.g., training the feature extraction layer(s)) can include, for example, supervised training and unsupervised training. Supervised training includes a target/outcome variable (e.g., a ground truth or dependent variable) to be predicted from a given set of predictors (independent variables). Using these set of variables, a function that can map inputs to desired outputs is generated. The training process continues until the model achieves a desired level of accuracy based on training data. Unsupervised training includes use of a machine learning algorithm to draw inferences from datasets consisting of input data without labeled responses. Unsupervised training sometimes includes clustering. Other types of training (e.g., hybrid and reinforcement) can also be used.

As mentioned above, the training of a ML model can continue until a desired level of accuracy is reached. Determination of the level of accuracy can include using a loss function. For example, loss functions can include hinge loss, logistic loss, negative log likelihood, and the like. Loss functions can be minimized to indicate a sufficient level of accuracy of the ML model training has been reached. Regularization can also be used. Regularization can prevent overfitting. Overfitting can be prevented by making weights and/or weight changes sufficiently small to prevent training (e.g., never ending) training.

Figure 2:
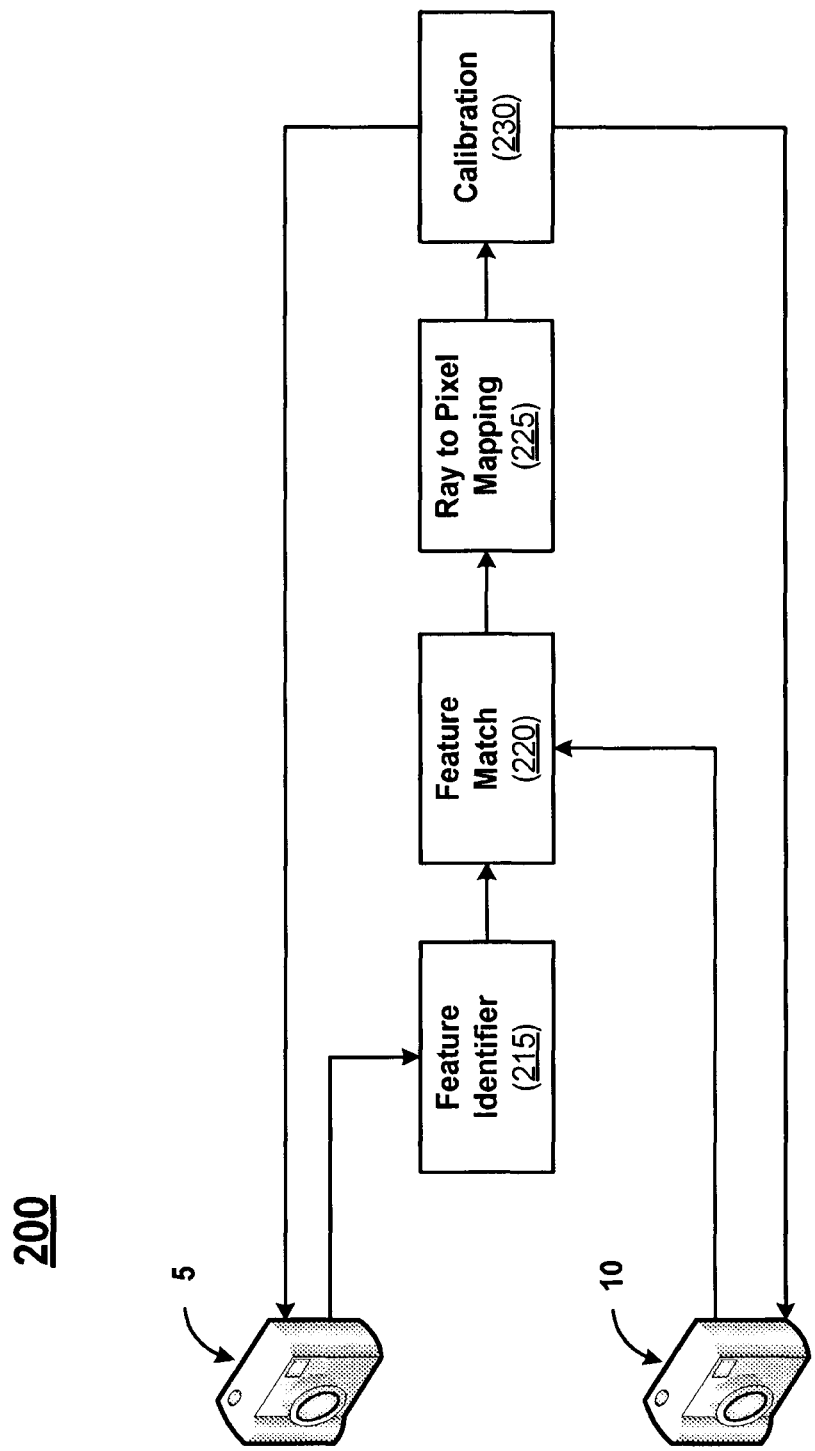
FIG. 2 illustrates a block diagram of a data flow according to at least one example embodiment.

FIG. 2 illustrates a block diagram of a data flow according to at least one example embodiment. The data flow is associated with calibrating cameras in a multi-camera system. As shown in FIG. 2, the data flow 200 includes the camera 5, the camera 10, a feature identifier 215 block, a feature match 220 block, a ray to pixel mapping 225 block, and a calibration 230 block. In data flow 200, a first image is captured by camera 5 and a second image is captured by camera 10. Each image can be of a real-world scene (e.g., substantially the same real-world scene). According to an example implementation, the real-world scene does not include specially designed calibration target (e.g., including characteristics identifiable for use in a camera calibration process). For example, each image can be of the scene illustrated in FIG. 1A. The first image can be a NIR image and the second image can be an RGB image. Camera 5 can communicate the first image to the feature identifier 215 block where a plurality of features can be identified in the first image (e.g., NIR image). For example, the portion of the image including features 120-1, 120-2, 120-3 as illustrated in FIG. 1A can include the identified features 122-1, 122-2, 122-3. The plurality of identified features can be communicated to the feature match 220 block. Camera 10 can communicate the second image to the feature match 215 block where a pixel of the plurality of identified features can be matched (e.g., located and matched) to a pixel of the plurality of features in the second image. For example, pixel 155 illustrated in FIG. 1B can be the RGB pixel matched in the NIR image and for use during calibration.

The plurality of matched features from both the first image and the second image are communicated from the feature match 220 block to the ray to pixel mapping 225 block. The ray to pixel mapping 225 block can map rays in the 3D space to pixels in the 2D space for the plurality of matched features associated with both the first image and the second image. For example, ray 145 illustrated in FIG. 1C and ray 150 illustrated in FIG. 1D can be mapped to pixels based on sensor position and the corresponding pixel position. The mapped rays to pixels can be used by the calibration 230 block to calibrate camera 5 and camera 10. The calibration 230 block can adjust calibration parameters to align the position of matched pixels (from the matched features) such that a pixel in the first image matched to a pixel in the second image are in substantially the same position in the 2D space of the images. For example, pixel 165-1' and pixel 165-2' as illustrated in FIG. 1H can be the aligned matched pixels.

The feature identifier 215 block can be configured to identify features in an image. The feature identifier 215 block can use corner and edge detection. Corner and edge detection can include using a Harris corner detector. The Harris corner detector is based on a local autocorrelation function of a signal, where the local autocorrelation function measures the local changes of the signal with patches shifted by a small amount in different directions. To find the corners in the input image, the technique analyzes the average intensity which is directional. The mathematical form of the Harris corner detector locates the difference in intensity for a displacement of (u, v) in all directions.

The feature identifier 215 block can use a machine learning (ML) model to identify features. The ML model can be trained using data (e.g., images) captured using a calibrated multi-camera system. The ML model can be a convolutional neural network. The ML model can use classification to identify a portion of an image as including (or being) a candidate feature. In an example implementation, the camera 5 is a NIR camera configured to capture a NIR image. The NIR image can be input to the ML model. The ML model can output a classification for a plurality of portions of the NIR image. The output can include a unique identifier for each portion of the NIR image, a position and/or dimension(s) of each portion of the NIR image and indicate each portion of the NIR image as including a candidate feature or not including a candidate feature. A candidate feature can include at least one pixel (e.g., of the NIR image) that can be easy to localize (e.g., indicate a position of the pixel(s) within the NIR image) precisely (e.g., corners, transitions, spots, and/or the like).

The feature match 220 block can be configured to use a ML model to locate a matching feature, identified as a candidate feature in a first image, in a second image. The ML model can be trained using data (e.g., images) captured using a calibrated multi-camera system. The ML model can be a convolutional neural network. The ML model can use scoring to identify a pixel(s) in the second as a possible match of a pixel(s) in the first image. For example, a high score can indicate the pixel as a likely match and a low score can indicate the pixel as not a likely match.

In an example implementation, the first image is a NIR image (capture by camera 5) and the second image is an RGB image (captured by camera 10). The feature match 220 block can receive data including a unique identifier for each portion of the NIR image, a position and/or dimension(s) of each portion of the NIR image and indicate each portion of the NIR image as including a candidate feature or not including a candidate feature. The data including the portion of the NIR image including a candidate feature can be input to the ML model. Each pixel associated with a portion of the NIR image including a candidate feature can be assigned a score (e.g., a score indicating the likelihood of a match) by the ML model.

For each candidate feature, a search window can be defined in the second (e.g., RGB) image. Each pixel inside the search window can be assigned a score using the ML model where high scores indicate pixels that are likely to correspond to pixel(s) in the candidate feature and low scores at other pixels. A second ML model (e.g., a second neural network) can be used to predict a position (e.g., x, y position) of an exact match for each pixel in the search window. An estimated offset for each pixel in the search window (e.g., a prediction of how far along the image x and y axes the exact matching pixel is from the current pixel) can be generated. An estimated offset for a matching pixel (e.g., pixels having a score that passes a criterion (e.g., above a threshold value)) can be calculated. For example, if a pixel in the search window is found to have a sufficiently high score (e.g., highly likely to match), the estimated offset of the pixel and its neighboring pixels can be averaged to find the estimated offset for the best matching pixel (as the target matching pixel) and a NIR to RGB match can be generated. The match (e.g., a position of a pixel in the second or RGB image) can be output from the second ML model with the estimated offset. In an example, the window(s) can be based on a previous calibration. For example, window position and dimensions can be based on window position and dimensions determined (and stored in memory) during a previous calibration.

The ML model(s) described above can be trained using data (e.g., images) captured using a calibrated multi-camera (e.g., NIR and RGB) system. Training can include generating a score for pixels associated with candidate features. Ground-truth data can include a number of features, positions of pixels in a feature, pixel scores and offsets. Training can include adjusting weights associated with the ML model (e.g., weights of the neural network) until the scores output of the ML model passes a criterion based on a comparison to the ground-truth data.

Figure 6:
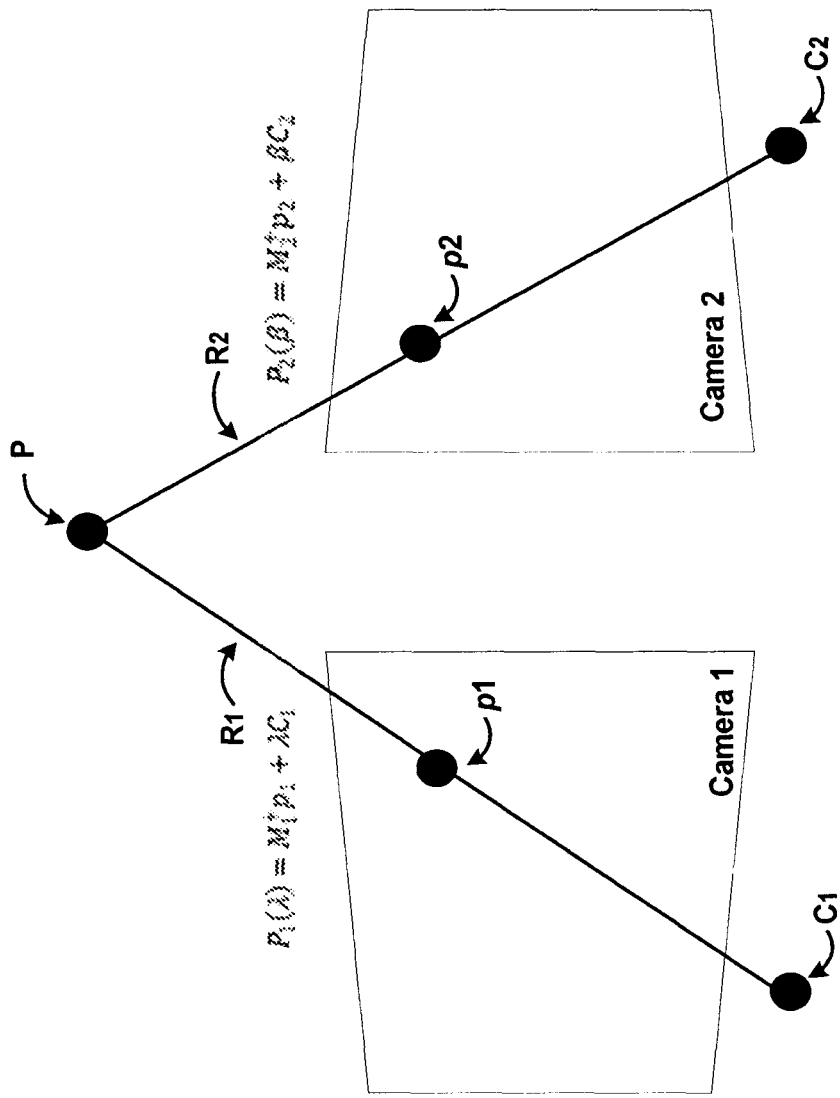
FIG. 6 shows a graphical representation of a point in a real-world scene.

The ray to pixel mapping 225 block can be configured to map a 3D point in real-world scene to a 2D point in image space and a 2D point in image space to a 3D ray in the real-world scene. Mapping from a point in the 3D real-world coordinate system to an image coordinate system can be based on a camera calibration matrix. Ray to pixel mapping can include a process including several mathematical calculations. One example illustration of these calculations can be described in reference to FIG. 6. Referring to FIG. 6, a point P in the real-world scene can be mapped as $p_i$, according to the equation $p_i = M_i P$ where M is the camera calibration matrix. Further, given the image (e.g., pixel) of a point (e.g., points p1 and p2) in two or more cameras (e.g., camera 1 and camera 2), the points' position in the real-world coordinate system can be determined using triangulation. For a point p, (p1, p2) in respective camera i (e.g., camera 1, camera 2) the image can project as a ray $R_i$ (e.g., $R_1$ and $R_2$). The equation of the ray in the real-world coordinate system can be given by $P_1(2) = M_1^+ p_1 + \lambda C_1$, where $C_i$ (e.g., C1 and C2) is the center of the camera in the real-world coordinate system. $C_i$ and $M_i^+$ can be obtained from the camera calibration parameters. The point in the real-world coordinate system can be obtained by finding the point of intersection between the rays from the multiple cameras. The value for point P can be derived using triangulation, and the position P can be computed by finding the values of $\lambda$ and $\beta$ in the equations $P_1(\lambda) = M_1^+ p_1 + \lambda C_1$ and $P_2(\beta) = M_2^+ p_2 + \beta C_2$.

Returning to FIG. 2, the calibration 230 block can be configured to calibrate camera 5 and or camera 10 with respect to each other. Calibration can include aligning the pixel (in an image) generated by camera 5 based on a ray (in the real-world) and the pixel (in an image) generated by camera 10 based on ray (in the real-world) to have the same position in the respective images. Calibration can include adjusting calibration parameters such that a first ray (e.g., $R_1$, ray 145) and a second ray (e.g., $R_2$, ray 150) are associated with a target pixel position (P). The target pixel position can be a point in the real-world scene coordinate system that is a point of intersection between the first ray and the second ray. Adjusting the calibration parameters such that the first ray and the second ray are interpreted as intersecting at a point in real (e.g., 3D) space can include causing the processed sensor position associated with the first ray and the second ray to shift in 2D as compared to uncalibrated camera(s). The calibration parameters can be included in the camera calibration matrix M. Therefore, modifying the calibration matrix M can result in a translation of points p1 and p2 (as matched pixels) such that rays $R_1$ and $R_2$ intersect at point P. In an example implementation, the number of matched pixels should be large (e.g., hundreds of matched pixels).

The calibration parameters can include intrinsic parameters and extrinsic parameters. Intrinsic parameters can include effective focal length, or image plane to projective center distance, lens distortion coefficient, scale factor for x, shift in origin of the acquired images due to camera scanning and/or acquisition timing error. Extrinsic parameters can be defined by the 3D position and orientation of the camera relative to a defined world coordinate system.

In an example implementation, the intrinsic parameters are considered to be within a specified range and the extrinsic parameters are adjusted. For example, parameters causing x, y, z coordinates of a point in the real-world scene to change can be an element of the calibration. Further, parameters causing the x-axis, y-axis, and z-axis (e.g., orientation) coordinates of a coordinate plane in the real-world scene to change can be an element of the calibration.

Figure 3:
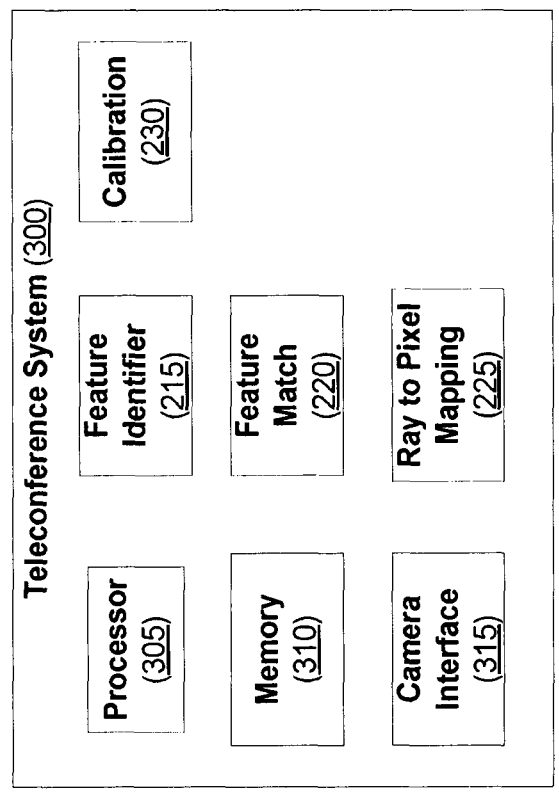
FIG. 3 illustrates a block diagram of a teleconference system according to at least one example embodiment.

FIG. 3 illustrates a block diagram of a teleconference system according to at least one example embodiment. The elements shown in FIG. 3 are related to (or include) calibrating the cameras of the teleconference system as illustrated in FIG. 2. As shown in FIG. 3, a teleconference system 300 includes at least one processor 305, at least one memory 310, a camera interface 315, the feature identifier 215 block, the feature match 220 block, the ray to pixel mapping 225 block, and the calibration 230 block. The feature identifier 215 block, the feature match 220 block, the ray to pixel mapping 225 block, and the calibration 230 block are described above.

The at least one processor 305 may be utilized to execute instructions stored on the at least one memory 310, so as to thereby implement the various features and functions described herein, or additional or alternative features and functions. The at least one processor 305 may be a general-purpose processor. The at least one processor 305 may be a graphics processing unit (GPU) and/or an audio processing unit (APU). The at least one processor 305 and the at least one memory 310 may be utilized for various other purposes. In particular, the at least one memory 310 can represent an example of various types of memory and related hardware and software which might be used to implement any one of the modules described herein.

The at least one memory 310 may be configured to store data and/or information associated with the teleconference system 300. For example, the at least one memory 310 may be configured to store code associated with calibrating cameras using identified real-world scene features. According to an example implementation, the real-world scene does not include specially designed calibration target (e.g., including characteristics identifiable for use in a camera calibration process). For example, the at least one memory 310 may be configured to store code associated with at least one trained ML model. The at least one memory 310 may be a non-transitory computer readable medium with code that when executed by the processor 305 cause the processor 305 to implement one or more of the techniques described herein. The at least one memory 310 may be a shared resource. For example, the model training system 300 may be an element of a larger system (e.g., a server, a personal computer, a mobile device, and the like). Therefore, the at least one memory 310 may be configured to store data and/or information associated with other elements within the larger system.

Figure 4:
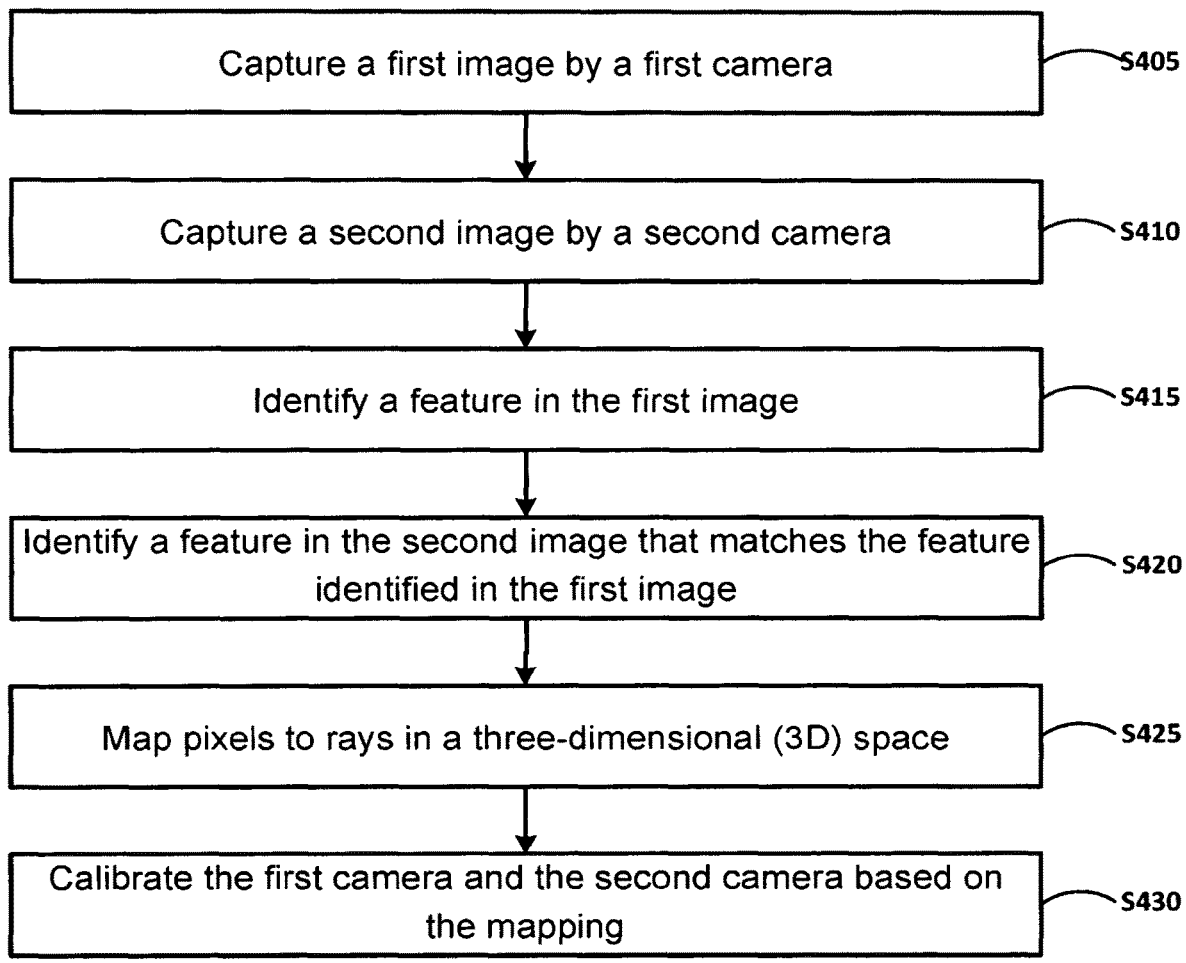
FIG. 4 illustrates a block diagram of a method for calibrating cameras according to at least one example embodiment.
Figure 5:
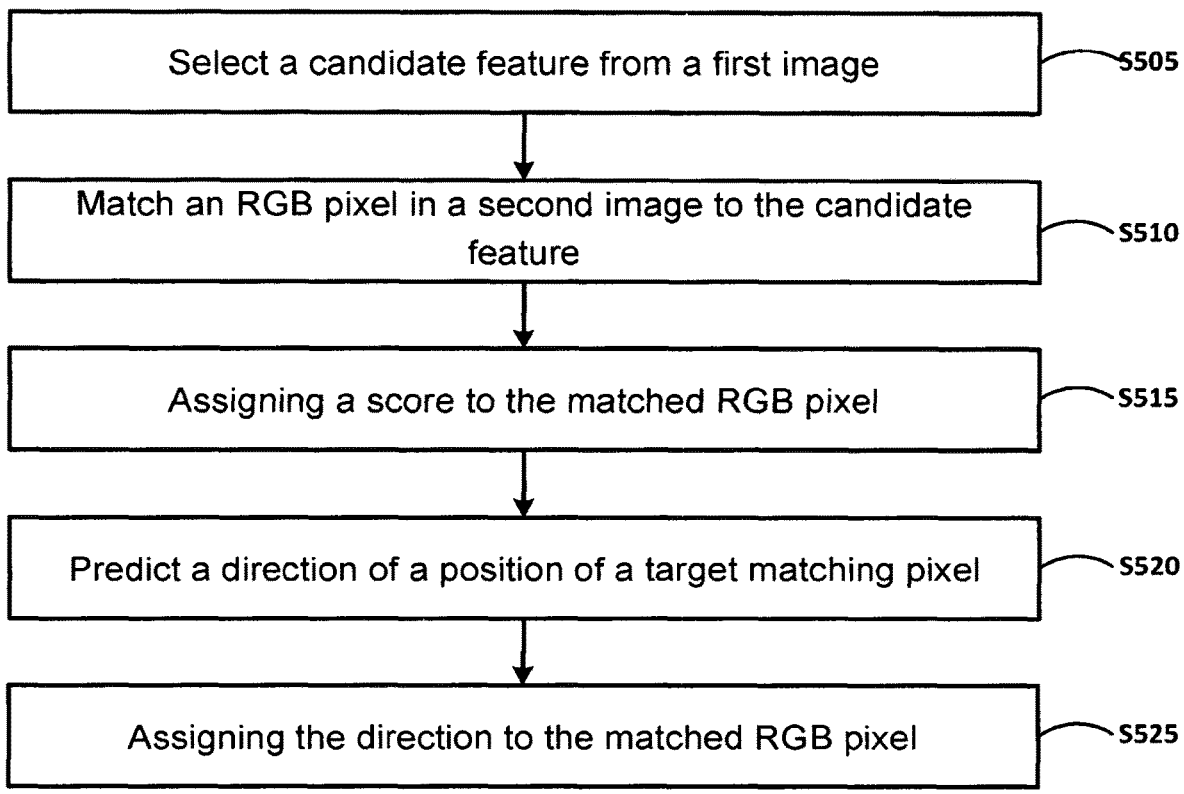
FIG. 5 illustrates a block diagram of a method for matching pixels according to at least one example embodiment.

FIGS. 4 and 5 are flowcharts of methods according to example embodiments. The methods described with regard to FIGS. 4 and 5 may be performed due to the execution of software code stored in a memory (e.g., a non-transitory computer readable storage medium) associated with an apparatus and executed by at least one processor associated with the apparatus.

However, alternative embodiments are contemplated such as a system embodied as a special purpose processor. The special purpose processor can be a graphics processing unit (GPU) and/or an audio processing unit (APU). A GPU can be a component of a graphics card. An APU can be a component of a sound card. The graphics card and/or sound card can also include video/audio memory, random access memory digital-to-analogue converter (RAMDAC) and driver software. The driver software can be the software code stored in the memory referred to above. The software code can be configured to implement the method described herein.

Although the methods described below are described as being executed by a processor and/or a special purpose processor, the methods are not necessarily executed by a same processor. In other words, at least one processor and/or at least one special purpose processor may execute the method described below with regard to FIGS. 4 and 5.

FIG. 4 illustrates a block diagram of a method for calibrating cameras according to at least one example embodiment. As shown in FIG. 4, in step S405 a first image is captured by a first camera. For example, the first camera can be sensitive to a first spectrum of light (e.g., IR, NIR and the like) and the first camera can have a first light source (e.g., an IR or NIR flash associated with the first camera). In an example implementation, the first camera can be a NIR camera and the first image can be a NIR image.

In step S410 a second image is captured by a second camera. For example, the second camera can be sensitive to a second spectrum of light (e.g., visible light) and the second camera can have a second light source (e.g., room light, sun light, and/or the like). In an example implementation, the second camera can be a visible light or an RGB camera and the first image can be an RGB image.

In step S415 a feature is identified in the first image. Feature identification can include use of corner and edge detection. Corner and edge detection can include using a Harris corner detector. The Harris corner detector is based on a local autocorrelation function of a signal, where the local autocorrelation function measures the local changes of the signal with patches shifted by a small amount in different directions. To find the corners in the input image, the technique analyzes the average intensity which is directional. The mathematical form of the Harris corner detector locates the difference in intensity for a displacement of (u, v) in all directions.

Alternatively, a machine learning (ML) model can be used to identify features in an image. The ML model can be trained using data (e.g., images) captured using a calibrated multi-camera system. The ML model can be a convolutional neural network. The ML model can use classification to identify a portion of an image as including (or being) a candidate feature. In an example implementation, the camera is a NIR camera configured to capture a NIR image. The NIR image can be input to the ML model. The ML model can output a classification for a plurality of portions of the NIR image. The output can include a unique identifier for each portion of the NIR image, a position and/or dimension(s) of each portion of the NIR image and indicate each portion of the NIR image as including a candidate feature or not including a candidate feature. A candidate feature can include at least one pixel (e.g., of the NIR image) that can be easy to localize (e.g., indicate a position of the pixel(s) within the NIR image) precisely (e.g., corners, transitions, spots, and/or the like).

In step S420 a feature in the second image that matches the feature identified in the first image is identified. For example, a ML model can be used to locate a matching feature, identified as a candidate feature in the first image, in the second image. The ML model can be trained using data (e.g., images) captured using a calibrated multi-camera system. The ML model can be a convolutional neural network. The ML model can use scoring to identify a pixel(s) in the second as a possible match of a pixel(s) in the first image. For example, a high score can indicate the pixel as a likely match and a low score can indicate the pixel as not a likely match.

In an example implementation, the first image is a NIR image and the second image is an RGB image. The ML model can use data including a unique identifier for each portion of the NIR image, a position and/or dimension(s) of each portion of the NIR image and indicate each portion of the NIR image as including a candidate feature as input to the ML model. In an alternate implementation, the first image is a RGB image and the second image is an NIR image.

For each candidate feature, a search window can be defined in the second (e.g., RGB) image. Each pixel inside the search window can be assigned a score using the ML model where high scores indicate pixels that are likely to correspond to pixel(s) in the candidate feature and low scores at other pixels. A second ML model (e.g., a second neural network) can be used to predict a position (e.g., x, y position) of an exact match for each pixel in the search window. An estimated offset for each pixel in the search window (e.g., a prediction of how far along the image x and y axes the exact matching pixel is from the current pixel) can be generated. An estimated offset for a matching pixel (e.g., pixels having a score that passes a criterion (e.g., above a threshold value)) can be calculated. For example, if a pixel in the search window is found to have a sufficiently high score (e.g., highly likely to match), the estimated offset of the pixel and its neighboring pixels can be averaged to find the estimated offset for the best matching pixel (as the target matching pixel) and a NIR to RGB match can be generated. The match (e.g., a position of a pixel in the second or RGB image) can be output from the second ML model with the estimated offset. In an example, the window(s) can be based on a previous calibration. For example, window position and dimensions can be based on window position and dimensions determined (and stored in memory) during a previous calibration.

In step S425 pixels are mapped to rays in a three-dimensional (3D) space. For example, a 3D point in a real-world scene can be mapped to a 2D point in image space and a 2D point in image space can be mapped to a 3D ray in the real-world scene. Mapping from a point in the 3D real-world coordinate system to an image coordinate system can be based on a camera calibration matrix. Ray to pixel mapping can include a process including several mathematical calculations. One example illustration of these calculations can be described in reference to FIG. 6. Referring to FIG. 6 (used to illustrate camera calculations of ray direction and angle), a point P in the real-world scene can be mapped as $p_i$, according to the equation $p_i = M_i P$ where M is the calibration matrix. Further, given the image (e.g., pixel) of a point (e.g., points p1 and p2) in two or more cameras (e.g., camera 1 and camera 2), the points' position in the real-world coordinate system can be determined using triangulation. For a point p, (p1, p2) in respective camera i (e.g., camera 1, camera 2) the image can project as a ray $R_i$ (e.g., $R_1$ and $R_2$). The equation of the ray in the real-world coordinate system can be given by $P_1(\lambda) = M_i^+ p_1 + \lambda C_1$, where $C_i$ (e.g., C1 and C2) is the center of the camera in the real-world coordinate system. $C_i$ and $M_i^+$ can be obtained from the camera calibration parameters. The point in the real-world coordinate system can be obtained by finding the point of intersection between the rays from the multiple cameras. The value for point P can be derived using triangulation, and the position P can be computed by finding the values of $\lambda$ and $\beta$ in the equations $P_1(\Delta) = M_i^+ p_1 + \lambda C_1$ and $P_2(\beta) = M_2^+ p_2 + \beta C_2$.

Returning to FIG. 4, in step S430 the first camera and the second camera are calibrated based on the mapping. For example, calibration can include aligning the pixel (in an image) generated by camera 5 based on a ray (in the real-world) and the pixel (in an image) generated by camera 10 based on ray (in the real-world) to have the same position in the respective images. Calibration can include adjusting calibration parameters such that a first ray (e.g., $R_1$, ray 145) and a second ray ($R_2$, ray 150) are associated with a target pixel position (P). The target pixel position can be the same position (e.g., x, y coordinates) in a 2D coordinate system representing a portion of an image. The target pixel position can be associated with a camera sensor position and the processed interpretation of a pixel associated with the camera sensor position.

Calibration can include adjusting the calibration parameters such that the first ray and the second ray are interpreted as intersecting at a point in real (e.g., 3D) space can include causing the processed sensor position associated with the first ray and the second ray to shift in 2D as compared to uncalibrated camera(s). The calibration parameters can include camera calibration matrix M. The calibration parameters can include intrinsic parameters and extrinsic parameters. Intrinsic parameters can include effective focal length, or image plane to projective center distance, lens distortion coefficient, scale factor for x, shift in origin of the acquired images due to camera scanning and/or acquisition timing error. Extrinsic parameters can be defined by the 3D position and orientation of the camera relative to a defined world coordinate system.

In an example implementation, the intrinsic parameters are considered to be within a specified range and the extrinsic parameters are adjusted. For example, parameters causing x, y, z coordinates of a point in the real-world scene to change can an element of the calibration. Further, parameters causing the x-axis, y-axis, and z-axis (e.g., orientation) coordinates of a coordinate plane in the real-world scene to change can an element of the calibration.

FIG. 5 illustrates a block diagram of a method for matching pixels according to at least one example embodiment. As shown in FIG. 5, in step S505 a candidate feature from a first image is selected. For example, a candidate feature can include at least one pixel (e.g., of the NIR image) that can be easy to localize (e.g., indicate a position of the pixel(s) within the NIR image) precisely (e.g., corners, transitions, spots, and/or the like). The candidate feature can be one of a plurality of features identified using a ML model. The first image can be captured by a first camera. The first camera can be sensitive to a first spectrum of light (e.g., IR, NIR and the like) and the first camera can have a first light source (e.g., an IR or NIR flash associated with the first camera). In an example implementation, the first camera can be a NIR camera and the first image can be a NIR image. In an alternate implementation, the first camera and the second camera can be sensitive to the same spectrum of light. For example, example implementations can reduce the effect of view-dependent effects associated with highly reflective surfaces and/or complex microgeometry (e.g., present in images including hair).

In step S510 an RGB pixel in a second image is matched to the candidate feature. For example, a ML model can be used to locate a matching feature, identified as a candidate feature in the first image, in the second image. The second camera can be sensitive to a second spectrum of light (e.g., visible light) and the second camera can have a second light source (e.g., room light, sun light, and/or the like). In an example implementation, the second camera can be a visible light or an RGB camera and the first image can be an RGB image.

In step S515 a score is assigned to the matched RGB pixel. For example, the ML model can use scoring to identify a pixel(s) in the second as a possible match of a pixel(s) in the first image. For example, a high score can indicate the pixel as a likely match and a low score can indicate the pixel as not a likely match.

In an example implementation, the first image is a NIR image and the second image is an RGB image. The ML model can use data including a unique identifier for each portion of the NIR image, a position and/or dimension(s) of each portion of the NIR image and indicate each portion of the NIR image as including a candidate feature as input to the ML model.

For each candidate feature, a search window can be defined in the second (e.g., RGB) image. Each pixel inside the search window can be assigned a score using the ML model where high scores indicate pixels that are likely to correspond to pixel(s) in the candidate feature and low scores at other pixels.

In step S520 a direction of a position of a target matching pixel (or target pixel) is predicted. For example, if a pixel in the search window is found to have a sufficiently high score (e.g., highly likely to match), the estimated offset of each pixel in the search window can be determined. An estimated offset for the best matching pixel and its neighboring pixels can be averaged to find the position of the best matching pixel (as the target matching pixel) and a NIR to RGB match can be generated.

In step S525 the direction is assigned to the matched RGB pixel. For example, a second ML model (e.g., a second neural network) can generate an estimated offset (e.g., a prediction of how far along the image x and y axes a target matching pixel is from the current pixel (e.g., pixels having a score that passes a criterion (e.g., above a threshold value)). The match (e.g., a position of a pixel in the second or RGB image) can be output from the second ML model with the estimated offset. In an example, the window(s) can be based on a previous calibration. For example, window position and dimensions can be based on window position and dimensions determined (and stored in memory) during a previous calibration.

Embodiments can include, a three-dimensional (3D) teleconferencing device, a system, a non-transitory computer-readable medium (having stored thereon computer executable program code which can be executed on a computer system), and/or a method can perform a process with a method including capturing a first image of a real-world scene by a first camera sensitive to a first spectrum of light, the first camera having a first light source, capturing a second image of the real-world scene by a second camera sensitive to a second spectrum of light, the second camera having a second light source, identifying at least one feature in the first image, identifying, using a machine learning (ML) model, at least one feature in the second image that matches the at least one feature identified in the first image, mapping pixels in the first image and the second image to rays in a three-dimensional (3D) space based on the matched at least one feature, and calibrating the first camera and the second camera based on the mapping.

Implementations can include one or more of the following features. For example, the first camera can be a near infrared (NIR) camera, and the second camera can be a visible light camera. A ML model can be used to identify the at least one feature in the first image. An algorithm can be used to identify the at least one feature in the first image. A ML model can be used to match the at least one feature in the first image to the at least one feature in the second image, and at least one pixel of the second image can be assigned a score based on a likelihood that the at least one pixel of the second image matches a pixel of the at least one feature in the first image. An algorithm can be used to match the at least one feature in the first image to the at least one feature in the second image, at least one pixel of the second image can be assigned a score based on a likelihood that the at least one pixel of the second image matches a pixel of the at least one feature in the first image, and the at least one pixel of the second image can be assigned a direction based on a prediction of a position of a target pixel.

An algorithm can be used to identify the at least one feature in the first image, and the matching of the at least one feature in the first image to the at least one feature in the second image can include selecting, using a first ML model, a candidate feature from the at least one feature in the first image, matching at least one pixel in the second image to a pixel of the candidate feature, assigning a score to the matched at least one pixel of the second image based on a likelihood that the at least one pixel matches one of the at least one feature in the first image, predicting a direction of a position of a target pixel using a second ML model, and assigning the direction to the matched at least one pixel of the second image. The calibrating of the first camera and the second camera can be based on the matched at least one pixel of the second image associated with the candidate feature with the highest score and the direction of the matched at least one pixel of the second image with the highest score, the direction being based on the matched at least one pixel of the second image with the highest score and neighboring pixels. The method can further include selecting at least one search window in the second image based on a previous calibration. The machine learning model(s) can be trained on data captured from a calibrated multi camera system.

Figure 7:
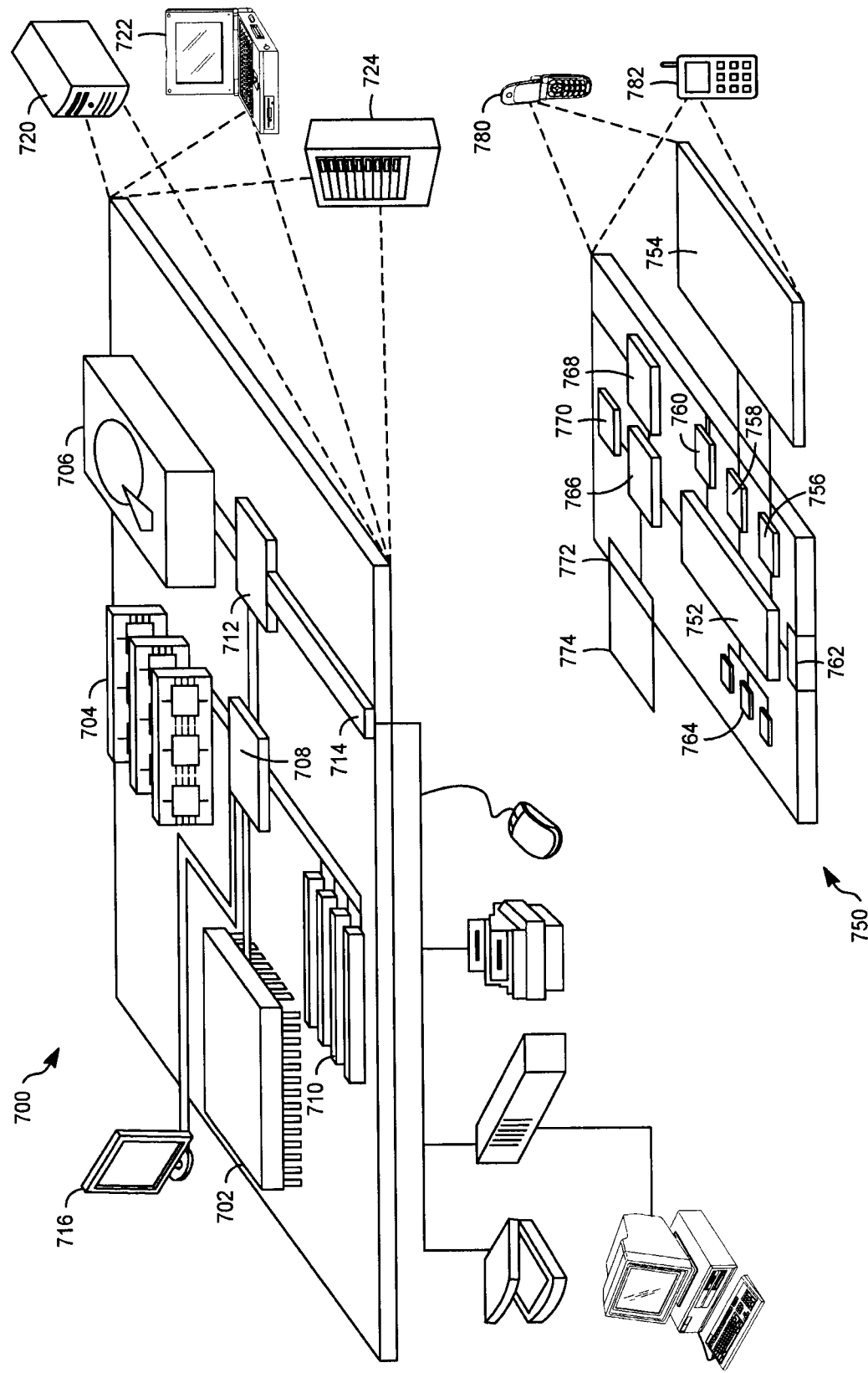
FIG. 7 shows an example of a computer device and a mobile computer device according to at least one example embodiment.

FIG. 7 shows an example of a computer device 700 and a mobile computer device 750, which may be used with the techniques described here. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high speed controller 708 manages bandwidth-intensive operations for the computing device 700, while the low speed controller 712 manages lower bandwidth-intensive operations. Such allocation of functions is exemplary only.

In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750 or may also store applications or other information for device 750. Specifically, expansion memory 774 may include instructions to carry out or supplement the processes described above and may include secure information also. Thus, for example, expansion memory 774 may be provide as a security module for device 750 and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752, that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, Wi-Fi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smart phone 782, personal digital assistant, or other similar mobile device.

While example embodiments may include various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. Various implementations of the systems and techniques described here can be realized as and/or generally be referred to herein as a circuit, a module, a block, or a system that can combine software and hardware aspects. For example, a module may include the functions/acts/computer program instructions executing on a processor (e.g., a processor formed on a silicon substrate, a GaAs substrate, and the like) or some other programmable data processing apparatus.

Some of the above example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments. Example embodiments, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term and/or includes any and all combinations of one or more of the associated listed items.

It will be understood that when an element is referred to as being connected or coupled to another element, it can be directly connected or coupled to the other element or intervening elements may be present. In contrast, when an element is referred to as being directly connected or directly coupled to another element, there are no intervening elements present. Other words used to describe the relationship between elements should be interpreted in a like fashion (e.g., between versus directly between, adjacent versus directly adjacent, etc.).

The terminology used herein is for the purpose of describing particular embodiments only and is not intended to be limiting of example embodiments. As used herein, the singular forms a, an and the are intended to include the plural forms as well, unless the context clearly indicates otherwise. It will be further understood that the terms comprises, comprising, includes and/or including, when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative embodiments, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as processing or computing or calculating or determining of displaying or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of non-transitory program storage medium or implemented over some type of transmission medium. The program storage medium may be magnetic (e.g., a floppy disk or a hard drive) or optical (e.g., a compact disk read only memory, or CD ROM), and may be read only or random access. Similarly, the transmission medium may be twisted wire pairs, coaxial cable, optical fiber, or some other suitable transmission medium known to the art. The example embodiments not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or embodiments herein disclosed irrespective of whether or not that particular combination has been specifically enumerated in the accompanying claims at this time.

What is claimed is:

1. A method comprising:
capturing a first image of a real-world scene by a first camera sensitive to a first spectrum of light, the first camera having a first light source;
capturing a second image of the real-world scene by a second camera sensitive to a second spectrum of light, the second camera having a second light source;
identifying at least one feature in the first image;
identifying, using a machine learning (ML) model, at least one feature in the second image that matches the at least one feature identified in the first image;
mapping pixels in the first image and the second image to rays in a three-dimensional (3D) space based on the matched at least one feature; and
calibrating the first camera and the second camera based on the mapping.

2. The method of claim 1, wherein the first camera is a near infrared (NIR) camera, and the second camera is a visible light camera.

3. The method of claim 1, wherein a ML model is used to identify the at least one feature in the first image.

4. The method of claim 1, wherein an algorithm is used to identify the at least one feature in the first image.

5. The method of claim 1, wherein
a ML model is used to match the at least one feature in the first image to the at least one feature in the second image, and
at least one pixel of the second image is assigned a score based on a likelihood that the at least one pixel of the second image matches a pixel of the at least one feature in the first image.

6. The method of claim 1, wherein
an algorithm is used to match the at least one feature in the first image to the at least one feature in the second image,
at least one pixel of the second image is assigned a score based on a likelihood that the at least one pixel of the second image matches a pixel of the at least one feature in the first image, and
the at least one pixel of the second image is assigned a direction based on a prediction of a position of a target pixel.

7. The method of claim 1, wherein
an algorithm is used to identify the at least one feature in the first image, and
the matching of the at least one feature in the first image to the at least one feature in the second image includes
selecting, using a first ML model, a candidate feature from the at least one feature in the first image,
matching at least one pixel in the second image to a pixel of the candidate feature,
assigning a score to the matched at least one pixel of the second image based on a likelihood that the at least one pixel matches one of the at least one feature in the first image,
predicting a direction of a position of a target pixel using a second ML model, and
assigning the direction to the matched at least one pixel of the second image.

8. The method of claim 7, wherein the calibrating of the first camera and the second camera is based on the matched at least one pixel of the second image associated with the candidate feature with the highest score and the direction of the matched at least one pixel of the second image with the highest score, the direction being based on the matched at least one pixel of the second image with the highest score and neighboring pixels.

9. The method of claim 1, further comprising selecting at least one search window in the second image based on a previous calibration.

10. The method of claim 1, wherein the ML model is trained on data captured from a calibrated multi camera system.

11. A three-dimensional (3D) teleconferencing system comprising:
a memory including code segments representing a plurality of computer instructions; and
a processor configured to execute the code segments, the computer instructions including:
capturing a first image of a real-world scene by a first camera sensitive to a first spectrum of light, the first camera having a first light source;
capturing a second image of the real-world scene by a second camera sensitive to a second spectrum of light, the second camera having a second light source;
identifying at least one feature in the first image;
identifying, using a machine learning (ML) model, at least one feature in the second image that matches the at least one feature identified in the first image;
mapping pixels in the first image and the second image to rays in a three-dimensional (3D) space based on the matched at least one feature; and
calibrating the first camera and the second camera based on the mapping.

12. The system of claim 11, wherein the first camera is a near infrared (NIR) camera, and the second camera is a visible light camera.

13. The system of claim 11, wherein a ML model is used to identify the at least one feature in the first image.

14. The system of claim 11, wherein an algorithm is used to identify the at least one feature in the first image.

15. The system of claim 11, wherein
a ML model is used to match the at least one feature in the first image to the at least one feature in the second image, and
at least one pixel of the second image is assigned a score based on a likelihood that at least one pixel of the second image matches a pixel of the at least one feature in the first image.

16. The system of claim 11, wherein
an algorithm is used to match the at least one feature in the first image to the at least one feature in the second image,
at least one pixel of the second image is assigned a score based on a likelihood that the at least one pixel of the second image matches a pixel of the at least one feature in the first image, and the at least one pixel of the second image is assigned a direction based on a prediction of a position of a target pixel.

17. The system of claim 11, wherein
an algorithm is used to identify the at least one feature in the first image, and
the matching of the at least one feature in the first image to the at least one feature in the second image includes
selecting, using a first ML model, a candidate feature from the at least one feature in the first image,
matching at least one pixel of the second image to the candidate feature,
assigning a score to the matched at least one pixel of the second image based on a likelihood that the at least one pixel of the second image matches one of the at least one feature in the first image,
predicting a direction of a position of a target pixel using a second ML model, and
assigning the direction to the matched at least one pixel of the second image.

18. The system of claim 17, wherein the calibrating of the first camera and the second camera is based on the matched at least one pixel of the second image with the highest score and the direction of the matched at least one pixel of the second image with the highest score, the direction being based on the matched at least one pixel of the second image with the highest score and a direction of neighboring pixels.

19. The system of claim 11, further comprising selecting at least one search window in the second image based on a previous calibration.

20. The system of claim 11, wherein the ML model is trained on data captured from a calibrated multi camera system.

21. A non-transitory computer readable medium containing instructions that when executed cause a processor of a computer system to perform steps comprising:
capturing a first image of a real-world scene by a first camera sensitive to a first spectrum of light, the first camera having a first light source;
capturing a second image of the real-world scene by a second camera sensitive to a second spectrum of light, the second camera having a second light source;
identifying at least one feature in the first image;
identifying, using a machine learning (ML) model, at least one feature in the second image that matches the at least one feature identified in the first image;
mapping pixels in the first image and the second image to rays in a three-dimensional (3D) space based on the matched at least one feature; and
calibrating the first camera and the second camera based on the mapping.

22. The non-transitory computer readable medium of claim 21, wherein
an algorithm is used to identify the at least one feature in the first image, and
the matching of the at least one feature in the first image to the at least one feature in the second image includes
selecting, using a first ML model, a candidate feature from the at least one feature in the first image,
matching at least one pixel of the second image to a pixel of the candidate feature,
assigning a score to the matched at least one pixel of the second image based on a likelihood that the at least one pixel of the second image matches one of the at least one feature in the first image,
predicting a direction of a position of a target pixel using a second ML model, and
assigning the direction to the matched at least one pixel of the second image.

23. The non-transitory computer readable medium of claim 21, wherein the first spectrum of light and the second spectrum of light are a same spectrum of light.

* * * * *